United States Patent
Hanke

[15] 3,699,962
[45] Oct. 24, 1972

[54] TUBULAR PLASTIC INSERTER FOR TAMPONS

[72] Inventor: David E. Hanke, Neenah, Wis.

[73] Assignee: Kimberly-Clark Corporation, Neenah, Wis.

[22] Filed: Oct. 28, 1970

[21] Appl. No.: 84,580

[52] U.S. Cl. .............................................. 128/263
[51] Int. Cl. ............................................. A61f 15/00
[58] Field of Search .............. 128/260, 263, 264, 270

[56] References Cited

UNITED STATES PATENTS 3,347,234   10/1967   Voss .......................... 128/260
3,575,169   4/1971    Voss et al. .................. 128/263

*Primary Examiner*—Lawrence W. Trapp
*Attorney*—Daniel J. Hanlon, Jr., William D. Herrick and Raymond J. Miller

[57] ABSTRACT

A plastic inserter for tampons consisting of inner and outer telescoping tubular members which are releasably interlocked against axial movement in both directions by mating configurations on the inner wall of the outer tube and the outer wall of the inner tube. One of the tubular members, preferably the outer member is made of a firm plastic, while the other member, is made of softer, less rigid plastic which more readily undergoes elastic deformation than the firm plastic whereby smooth disengagement of the interlocked tubes results when axial force is applied to the trailing end of the inner tube member by the user in order to release the interlock and eject the contents of the outer tube member.

9 Claims, 2 Drawing Figures

PATENTED OCT 24 1972

3,699,962

TUBULAR PLASTIC INSERTER FOR TAMPONS

BACKGROUND OF THE INVENTION

In the art directed to catamenial tampon inserters and the like, telescoping tubes made of flexible plastic such as polyethylene are now appearing on the market. These inserters are provided with a stop means which prevent the inner tube from rearward disengagement from the outer tube. In one such construction the forward end of the inner tube has an outwardly turned annular flange while the trailing end of the outer tube has an inwardly projecting annular rim. This effectively prevents rearward movement of the inner tube. Restriction against forward movement is provided only by the tampon body which frictionally engages the wall of the outer tube. It has been found that in many cases such frictional engagement is not sufficient to prevent inadvertent forward movement and premature displacement of the tampon. Accordingly, it is desirable that telescoping tube inserters be provided with a locking arrangement of a sort which prevents inadvertent axial movement in either direction between tubes during shipment and before use. The most common arrangement suggested for this purpose is to provide the outer and inner plastic tubes with mating protuberances and indentations which nest within each other but which may be axially displaced by resilient deformation when sufficient axial pressure is applied. A typical arrangement comprises an annular groove on the inner wall of the outer tube and a matching annular rib on the outer wall of the inner tube, or vice versa. This arrangement works reasonably well when both tubular members are made of a soft plastic such as low density polyethylene.

However it is important that when such devices are used for catamenial purposes, and particularly when employing an outer tube having a tapered tip comprised of flexible segments, the plastic employed for the outer tube be rigid enough not to collapse under the radial pressures exerted by the introital muscles during insertion. Polypropylene fills this requirement. However, when polypropylene, or a similar rigid plastic, is employed for both the outer and inner tube members, the axial force needed to initially release such an interlocking arrangement is objectionably high. As a result when sufficient axial force is applied to the inner tube by the user to obtain release of the interlock, the initial longitudinal movement which occurs as the interlock is broken is quite abrupt and precipitous. This causes the tampon to be expelled from the outer tube into the body cavity so abruptly by the user that it is considered highly objectionable. One such objection being unpredictability as to how much force is required and a lack of positive control by the user. Another being an underlying fear of possible injury such precipitous release might cause.

Efforts have been made to alleviate this situation by reducing the depth of the groove and the height of the cooperating rib, but this provides a loose interlock which is difficult to match properly and which often releases too easily, causing the aforesaid premature separation and product failure. Another attempted solution has been to taper the cooperating groove and rib configurations in the direction of movement. While this latter variation permits a smoother start, the sudden precipitous release still occurs at the moment enough force is finally exerted to provide complete separation of the interlock.

This invention is directed to a structure which assures a smooth, easy controllable release along with a firm interlock, a firmer plastic is used in the construction of at least one of the tubular members.

SUMMARY OF THE INVENTION

In brief, this invention involves making one of the tubular members which are releasably interlocked in slideable association as described above of a more easily deformable plastic composition than the other member. The locking arrangement is normally composed of projecting portions extending outwardly from the outer surface of the inner tube, which mate with indented portions disposed on the inner surface of the outer tube, although the location of the projecting portions and the indented portions may be reversed. In the preferred construction of this invention the inner member is made of a softer, substantially less rigid plastic than the outer member. In a less preferred construction the outer tube may be soft and the inner tube hard. In one satisfactory example, the outer tube is made of polypropylene and the inner tube is made of low density polyethylene. When tubes of this disparate construction are used, the application of axial force permits the softer plastic to deform much more readily to disassociate the locking device. This permits the user to exercise better control in expelling the tampon body from the outer tube. On the other hand, when both tubes are made of a relatively rigid plastic such as polypropylene; deformation of the interlock portions is much more difficult; the interlock releases with a precipitous, jerky action; and the result is a sudden expulsion of the tampon body and loss of control by the user. When both tubes are made of low density polyethylene, and the outer tube is of tapered tip construction, the entire structure is generally too soft to give sufficient support to the segments in the tapered tip during insertion to prevent their collapse when inserted between the introital muscles. For satisfactory performance in such instances the outer tube must be of the firmer plastic.

Accordingly it is the principal object of this invention to provide an improved temporary interlock against longitudinal movement in both directions for a pair of telescoped insertion tubes.

To more clearly define this and other objects and advantages reference should be made to the accompanying drawings and related specification describing preferred embodiments of the invention.

DESCRIPTION OF THE PREFERRED EMBODIMENTS

Figure 1:
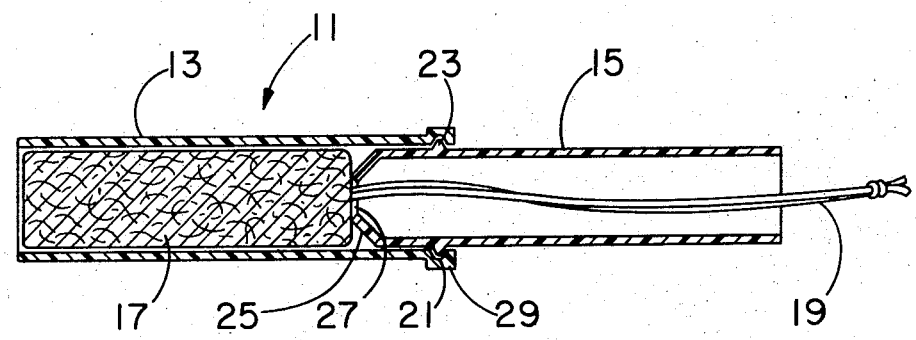
FIG. 1 is a longitudinal section of a typical telescoped tube and tampon assembly having a bidirectional interlock.

Referring to FIG. 1, a typical applicator 11 comprises an outer tube 13 and an inner tube 15 telescopically associated therewith. The outer tube 13 is adapted to receive a tampon 17 in its forward end portion with the front end of the tampon substantially in line with the front end of the outer tube. The rear end of tampon 17 has the usual withdrawal cord 19 attached thereto which extends through the center of inner tube 15 and beyond the trailing end thereof.

The inner surface of outer tube 13 is provided with a circumferential indentation or channel 21 in close proximity to its trailing end. The outer surface of inner tube 15 is provided with a circumferential bead or rib 23 spaced inwardly a sufficient distance from the leading end of the inner tube to provide a sufficient area of close contact between inner and outer tube surfaces to prevent play or wobble between tubes. Rib 23 is nested in channel 21 to form a releasable interlock between the tubes. Inner tube 15 has a beveled leading end 25 for positive engagement of tampon 17 and has an aperture 27 in the leading end through which withdrawal string 19 extends.

Outer tube 13 also has a flange 29 encircling its trailing edge which serves as a finger-gripping portion when the tube applicator is being used. To use the device the flanged end 29 is grasped between thumb and middle finger, while inner tube 15 is pushed forward to disengage rib 23 from channel 21 and eject tampon 17. Disengagement is obtained primarily by radial deflection of the wall of inner tube 15 adjacent rib 23.

It has recently been determined that it would be desirable to make such devices from a firmer plastic than the low density polyethylene now commonly employed. However, when both inner and outer tubes are made from rigid plastic materials such as polypropylene, and employ a cooperating rib-and-channel interlock of the type illustrated, considerable axial force is required before the wall of tube 15 will deflect sufficiently to obtain release. When release is obtained it is quite precipitous and unpredictable.

It has now been found that if one of the tubular elements, and preferably the inner tube is made from a softer more easily deformable plastic, that this problem is eliminated.

It should be noted that this improved structure is applicable only to telescoped tube devices which have an interlock arrangement which prevents longitudinal movement in both directions. In constructions where the inner tube has only a simple outwardly turned flange on its forward end and the outer tube has an inwardly projecting rim on its trailing end, the flange and rim cooperate to prevent only rearward movement. Restriction of forward movement is provided primarily by the frictional engagement of the tampon body itself with the inner wall of the outer tube. In such structure a more resilient inner tube is not required or desirable. However, since inadvertent forward displacement of the tampon could take place prematurely in arrangements which depend only on frictional engagement of tampon and tube to prevent such movement, the advantages of the two-way interlock are readily apparent.

Figure 2:
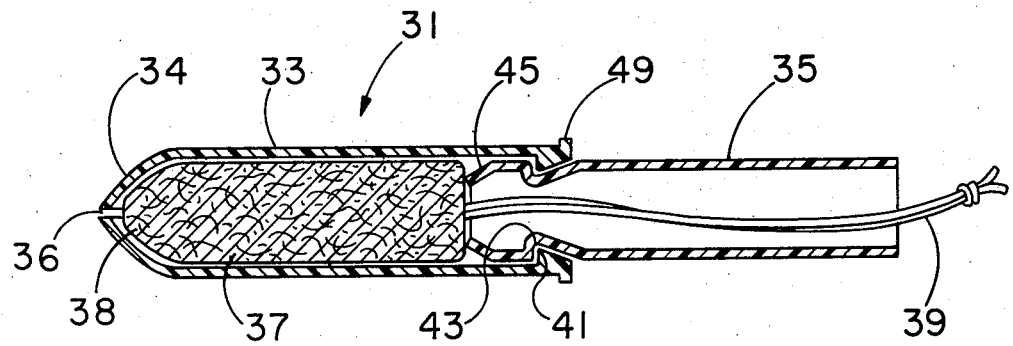
FIG. 2 is a longitudinal section of another such assembly.

In FIG. 2 there is shown another typical applicator 31 for a different form of a tube-type tampon inserter device. This embodiment also comprises an outer tube 33 and an inner tube 35 in telescoping engagement therewith. A tampon 37 with a tapered or conical forward end 38 is disposed in the forward end portion of outer tube 33. Outer tube 33 has a tapered forward end 34 comprising segmented petal-shaped portions formed by slits 36 in the tapered end. The segments are adapted to open outwardly as tampon 37 is ejected. A withdrawal string 39 is attached to the trailing end of tampon 37 and extends through inner tube 35 in the customary manner. In this embodiment the inner surface of outer tube 33 is provided with an inwardly protruding circumferential ridge 41 which tapers outwardly toward the trailing end of the tube. The outer surface of the inner tube 35 is provided with an inwardly directed circumferential groove 43 which tapers outwardly and rearwardly in matched engagement with ridge 41. The groove 43 is spaced a sufficient distance from beveled leading end 45 of inner tube 35 to prevent play or wobble between tubes. Outer tube 33 also has a finger gripping rim 49 as its trailing end.

Operation of this device is similar to the FIG. 1 device, except that the cooperating tapers of ridge 41 and groove 43 assist in providing a smoother transition from interlock to release as inner tube wall is more gradually deflected than when an untapered interlock is used.

In the preferred embodiment of both constructions shown, outer tubes 13 and 33 are made of polypropylene and inner tubes 15 and 35 are made of low density polyethylene.

In addition to polypropylene other firm plastics may be used for the outer tube including high density polyethylene, semi-rigid polyvinyl chloride, high impact polystyrene, hydroxypropyl cellulose, nylon, polyacetal, polymethyl methacrylate, ABS copolymers, and polyethylene oxide.

Suitable plastics for the softer inner tube are more limited in number and include only low density polyethylene and plasticized polyvinyl chloride. However, any other plastic which has similar softness characteristics may also be used for the inner tube.

In designing the dimensions of the cooperating tubes clearance between inner and outer walls should be quite close and only sufficient to prevent any noticeable play or wobble. The protruding portions of the interlocking areas may extend outwardly about 0.005 to 0.050, inch or sufficient to give a strong lock against longitudinal movement. Dislodging force may be in the range of 100–600 grams axial force, with an average force of 400 grams preferred.

While in the preferred embodiments, the cooperating rib and channel configurations are described as annular and more or less continuous, it will be seen that each could be segmented in matched areas, or at least the raised rib portions could be segmented and still be operative.

In the embodiments described above, it is preferred that the outer tube be made of the firmer plastic. However, there are situations in which a soft plastic is suitable for use as the outer tube. In any event, to produce the desired results, at least one of the tubes should be firm while the other is soft in order that it may more easily undergo elastic deformation than the firmer tube.

What is claimed is:

1. In an applicator comprising an outer plastic tube adapted to contain a tampon device, and an inner plastic tube telescopically disposed within said outer tube for longitudinal movement therein and wherein said tubes are temporarily interlocked against bidirectional longitudinal movement by an annular channel portion on one tube mated with an annular rib portion on the other tube, the improvement wherein at least one of said tubes comprises a plastic which is firmer than the plastic utilized in the other of said tubes whereby the application of axial force permits the mated portion of the other of said tubes to undergo elastic deformation more readily than does the mated portion of the tube made from said firmer plastic.

2. The applicator of claim 1 wherein said more readily deformable tube is said inner tube.

3. The applicator of claim 2 wherein said outer tube has a segmented, tapered, leading end.

4. In an applicator comprising an outer plastic tube adapted to contain a tampon device, and an inner plastic tube telescopically disposed within said outer tube for longitudinal movement therein and wherein said tubes are temporarily interlocked against bidirectional longitudinal movement by an annular channel portion on one tube mated with an annular rib portion on the other tube, the improvement wherein at least one of said tubes comprises a firm flexible plastic selected from the group consisting of polypropylene, high density polyethylene, semi-rigid polyvinyl chloride, high impact polystyrene, hydroxypropyl cellulose, nylon, polyacetal, polymethyl methacrylate, ABS copolymers and polyethylene oxide, and the other of said tubes comprises a softer more easily deformable plastic selected from the group consisting of low density polyethylene and plasticized polyvinyl chloride whereby the mated portion of said tube made from said softer plastic undergoes elastic deformation more readily upon application of axial force than does the mated portion of the tube made from said firm plastic.

5. The applicator of claim 4 wherein the tube comprised of said firm plastic is the outer tube.

6. The applicator of claim 5 wherein said outer tube has a segmented, tapered, leading end.

7. The applicator of claim 1 wherein said ribs protrude from about 0.005 inch to about 0.050 inch.

8. The applicator of claim 1 wherein the axial force necessary to disengage said temporary interlock is from about 100 to 600 grams.

9. The applicator of claim 1 wherein the axial force necessary to disengage said temporary interlock is about 400 grams.

* * * * *